United States Patent [19]

Sauer

[11] 4,208,851
[45] Jun. 24, 1980

[54] SUSPENDED CEILING SYSTEM

[75] Inventor: Gale E. Sauer, Williamsville, N.Y.

[73] Assignee: Roblin Industries, Inc., Buffalo NY

[21] Appl. No.: 950,433

[22] Filed: Oct. 11, 1978

Related U.S. Application Data

[63] Continuation of Ser. No. 771,063, Feb. 25, 1977, abandoned.

[51] Int. Cl.² .............................................. E04B 5/55
[52] U.S. Cl. ....................................... 52/573; 52/667;
  52/726; 52/DIG. 5; 403/22; 403/188; 403/230;
  403/363
[58] Field of Search ................ 52/573, 667, 484, 664,
  52/666; 403/28, 363, 375, 186, 230, 188, 189

[56] References Cited

U.S. PATENT DOCUMENTS

| | | | |
|---|---|---|---|
| 3,321,882 | 5/1967 | Stahlhut | 52/484 |
| 3,791,089 | 2/1974 | Alderman | 52/484 |
| 3,846,031 | 11/1974 | Adams | 52/484 |
| 3,979,874 | 9/1976 | Cubbler | 52/664 |
| 4,062,301 | 12/1977 | Pitchford | 52/667 |

Primary Examiner—John E. Murtagh

[57] ABSTRACT

A fire rated dry wall ceiling support system having fixed, aligned main beam members spliced together in a manner so as to absorb longitudinal compression, as for example resulting from thermal expansion during a fire. Each main beam includes a web surmounted by a bead with flange portions extending laterally outwardly from the web. Each web end includes a tongue extending axially outwardly for locking engagement with the adjacent beam member web and is so configured that the tongues fold in a longitudinal manner and become laterally displaced out of the normal plane of the tongues when the beam members are longitudinally compressed towards one another. Accordingly, the bead means become laterally displaced while moving towards one another in a longitudinal direction and may in fact overlap one another in a longitudinal sense. The system further includes support channels disposed transversely to the main beam members and engaged therewith. The main beams include pairs of longitudinally spaced slots which receive the ends of the transverse cross channels from both sides of the main beam. The ends of the cross channels are locked in the main beam slots. The slots and cross channel ends are designed to absorb thermal expansion in the transverse cross channels during a fire situation. In addition the cross channels include a horizontal base portion which provides an effective mounting surface for dry wall ceiling panels.

34 Claims, 10 Drawing Figures

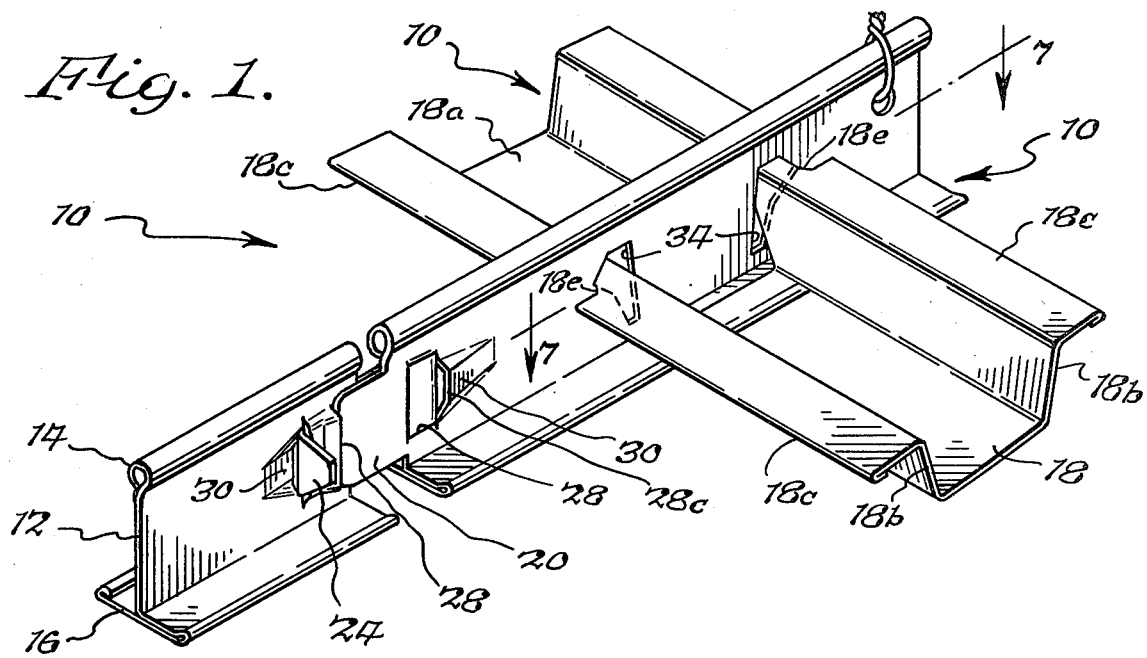
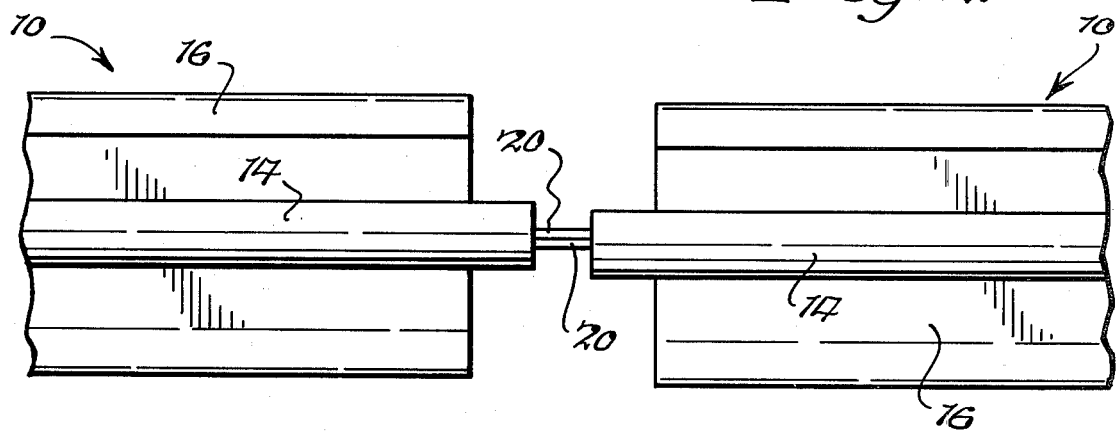
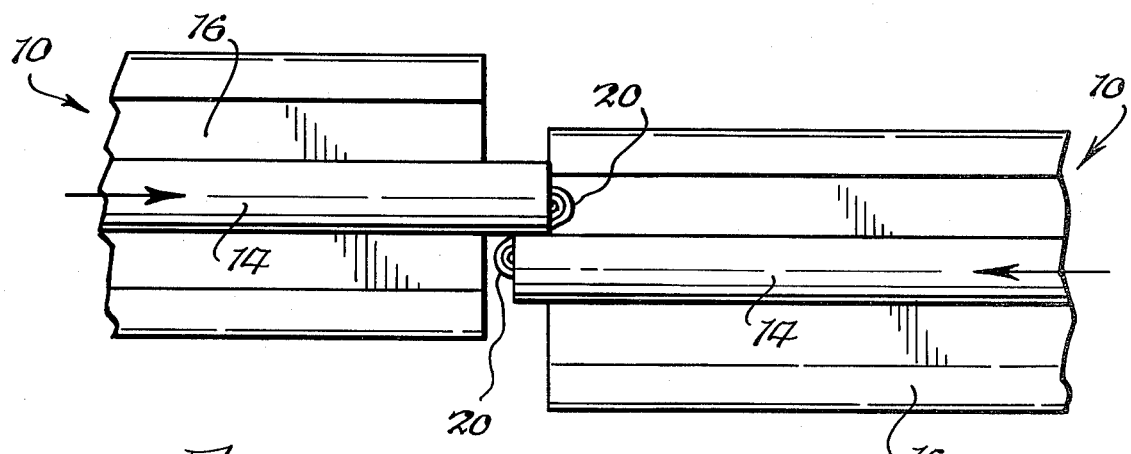

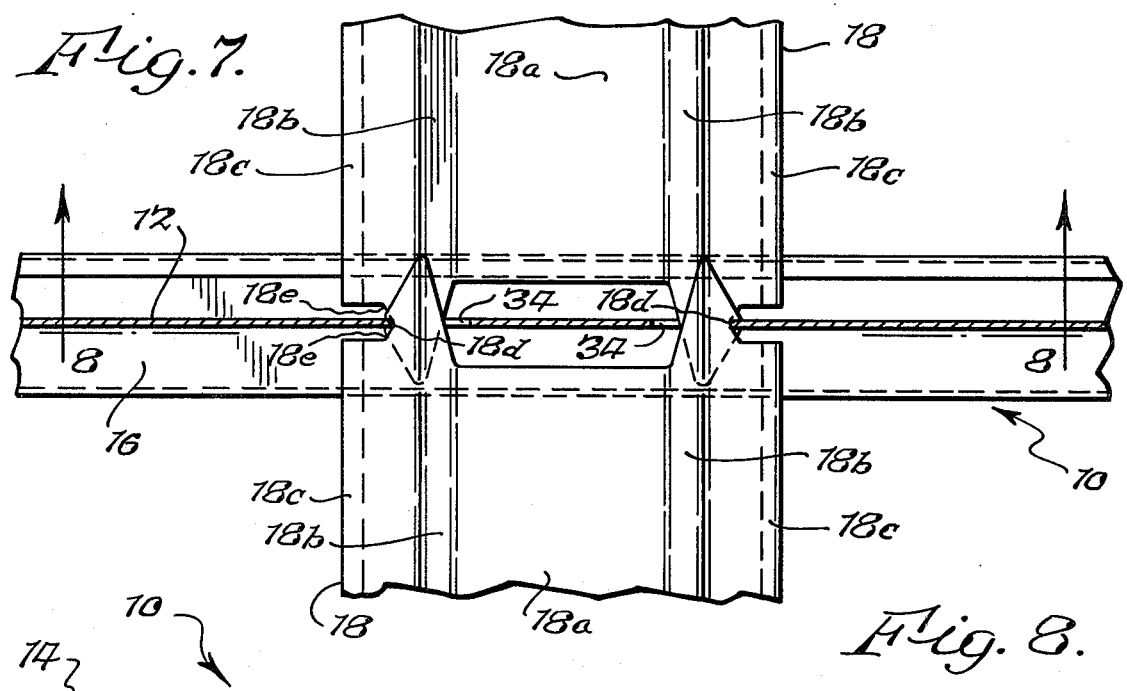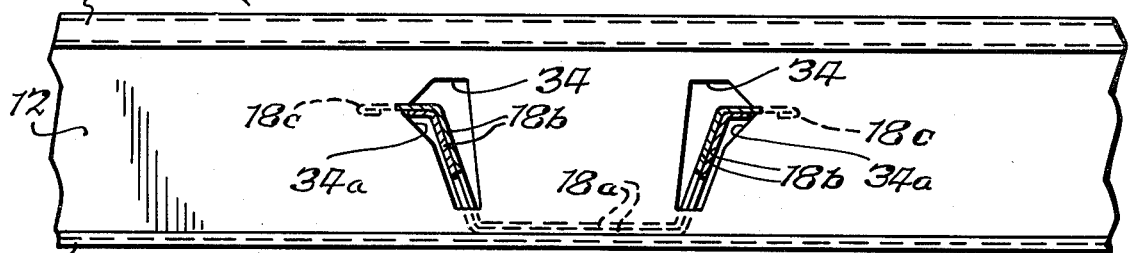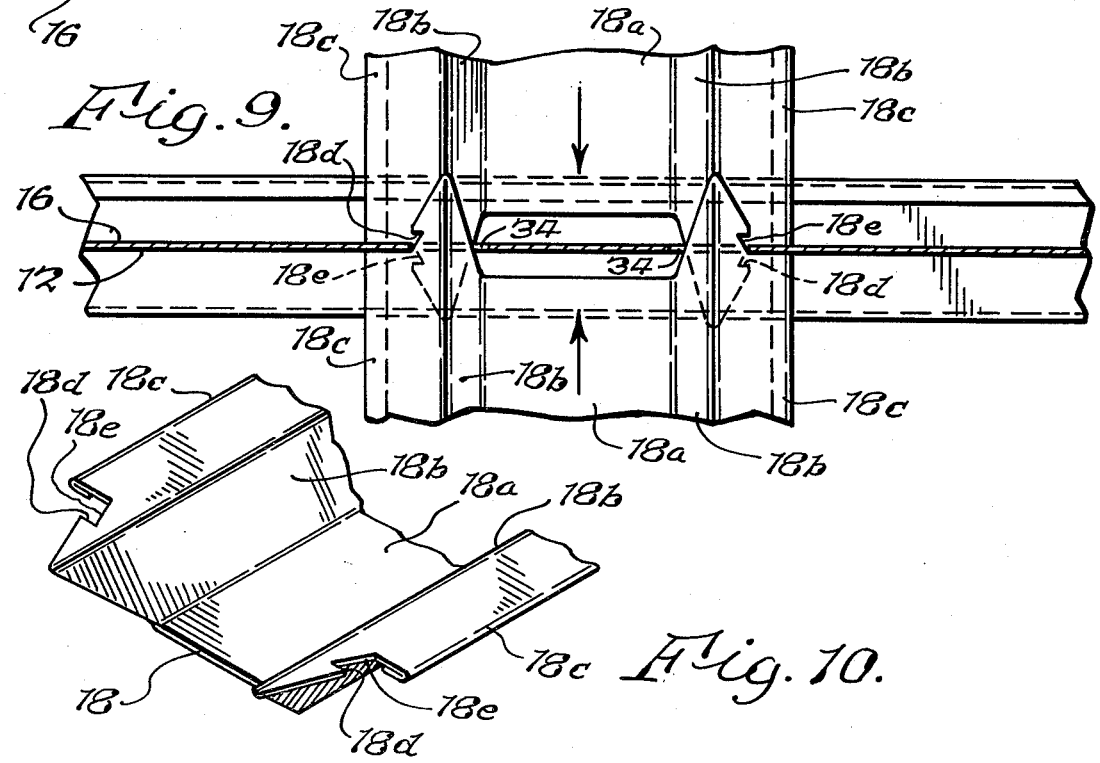

SUSPENDED CEILING SYSTEM

This is a continuation of application Ser. No. 771,063 filed Feb. 25, 1977 now abandoned.

BACKGROUND OF THE INVENTION

This invention relates generally to fire-resistant ceiling supporting systems and the like and, more particularly to a supporting system for dry wall ceilings capable of absorbing thermal expansion in the system components without substantial buckling or collapsing of the dry wall ceiling during abnormally elevated temperatures, thereby preserving the integrity of the ceiling as a barrier under such conditions.

The present invention is particularly adapted for use in a dry wall ceiling grid system of the type comprising a plurality of parallel spaced main beam or grid members and cross channel support members extending transversely between the main beam members and having end portions interlocking therewith. These interlocked grid members generally are suspended from a conventional ceiling or an overhead support structure.

One of the critical problems encountered in supporting grid structures of the type referred to hereinabove is to maintain the integrity thereof and the associated ceiling under abnormally elevated temperatures, such as accompany a fire. Under these high temperature conditions, the metallic members of the supporting system which generally are fixed at their opposite ends, expand and buckle whereby the supported ceiling panels are displaced and break away to such an extent that they drop to the floor below. As a result, the effectiveness of the suspended ceiling as a barrier is destroyed and the overhead ceiling and related support structure is exposed to the fire whereby the latter can spread more easily and rapidly throughout the entire structure.

SUMMARY OF THE INVENTION

Accordingly, a primary object of this invention is to provide a grid support system for dry wall systems having main beam support members and cross channel support members disposed transversely with respect to the main beams wherein the main beams and cross channels both accommodate expansion resulting from extreme heat with the resulting deformation of the main beams and cross channels taking place in a controlled and predetermined manner so as to preserve the integrity of the dry wall ceiling under elevated temperature conditions.

Another object of the present invention is to provide the aforesaid grid system having a specially configured connecting means on the adjacent ends of the main beam members providing for a controlled deformation thereof at predetermined areas.

A further object of the present invention is to provide the foregoing grid system with a specially configured locked connection at the intersection of the cross channel members with a main beam member which, in a preferred form, accommodates thermal expansion of the cross channel members without any significant effect on the orientation, in a lateral sense, of the main beam members.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 1 is a fragmentary, perspective view of a pair of connected main grid or beam members, one of which is intersected by and connected to transversely disposed cross channel members on both of its sides;

FIG. 2 is a fragmentary, enlarged top plan view of the main beam members shown in FIG. 1 prior to relative longitudinal compression;

FIG. 3 is a view similar to FIG. 2 illustrating the relative longitudinal movement and lateral displacement of the main beam members after being subjected to thermal expansion;

FIG. 7 is an isolated top view, partly in section, illustrating the locked connection of the adjacent ends of a pair of cross channel members to the web of a main beam member;

FIG. 8 is a fragmentary, elevational view, partly in section, as taken about on line 8—8 of FIG. 7;

FIG. 9 is a view similar to FIG. 7 illustrating the relative longitudinal displacement of the cross channel members after being subjected to thermal expansion; and FIG. 10 is a fragmentary, perspective view of the end portion of a cross channel member.

DETAILED DESCRIPTION OF A PREFERRED EMBODIMENT

Figure 4:
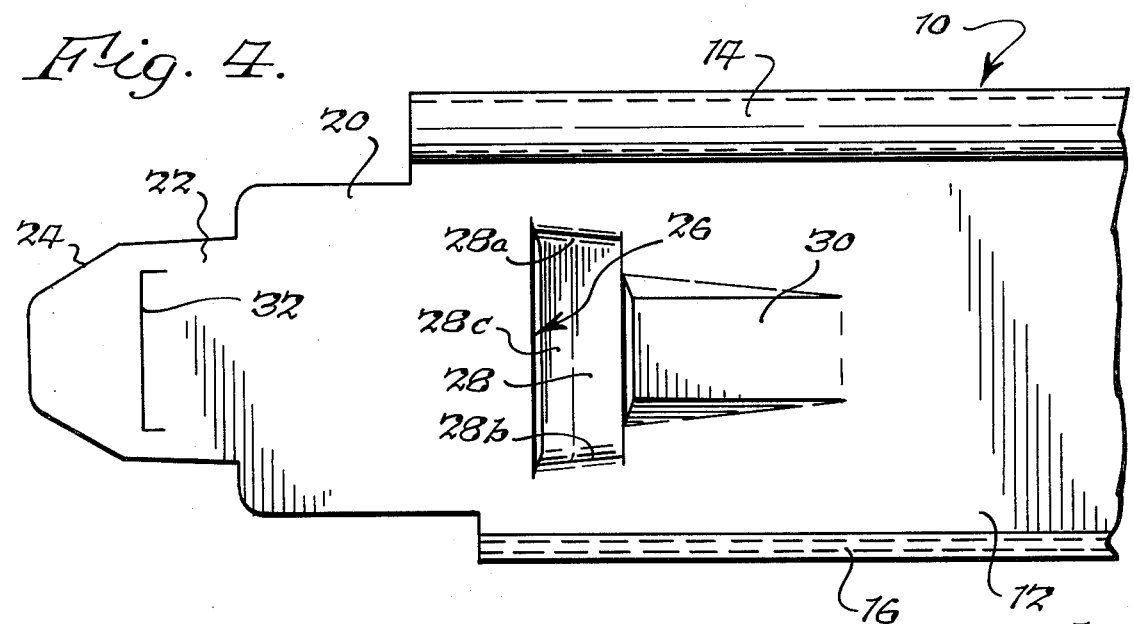
FIG. 4 is a fragmentary enlarged view of the end portion of a main beam member.

Referring now in detail to the illustrative embodiment depicted in the accompanying drawings, there is shown in FIG. 1 a dry wall ceiling grid system incorporating a main T-support member, generally designated 10, connected in an end-to-end relation to another main beam member 10 as shown. Each of the main beam support members includes an upstanding web portion 13 which is surmounted by a bead means 14. Along the bottom edge of web 12 there is provided a laterally extending flange means 16. The adjacent ends of the main beam members 10 include connecting means for rigidly splicing beams 10 one to the other in an end-to-end relation as to be described in detail hereinbelow. In addition, the grid system includes cross channel support members 18 disposed transversely with respect to the main beams and which have their respective ends interlocked in the web of a main beam member. The interlocking of the cross channels 18 in the main beam webs will also be described in detail hereinbelow as forming part of applicant's invention.

Although not shown, it is to be understood that dry wall ceiling panels are to be attached to the underside of the cross channel support members 18 and flange means 16, as for example through the use of metal screws which could be engaged with such component parts of the grid system. In this regard, it is anticipated that the relatively greater planar surface provided on the bottom of the cross channels will be the principal surface to which the dry wall panels will be affixed although metal screws could be engaged with flanges 16. In this regard, it has been found advantageous to provide knurling on the bottom surface of the cross channels so as to facilitate the installation of metal screws therein.

One object of the present invention is to provide for thermal expansion along the several lengths of main beam members 10 and along the transversely disposed cross channels 18. If thermal expansion in the grid members was not provided for, then in the event of a fire and associated extreme heat, there would be buckling of the grid members and relative disorientation among the same. Accordingly, the present invention provides for limited movement of the grid members so as to accommodate the thermal expansion therein so that the mounting of the dry wall panels thereto will not be broken.

Figure 5:
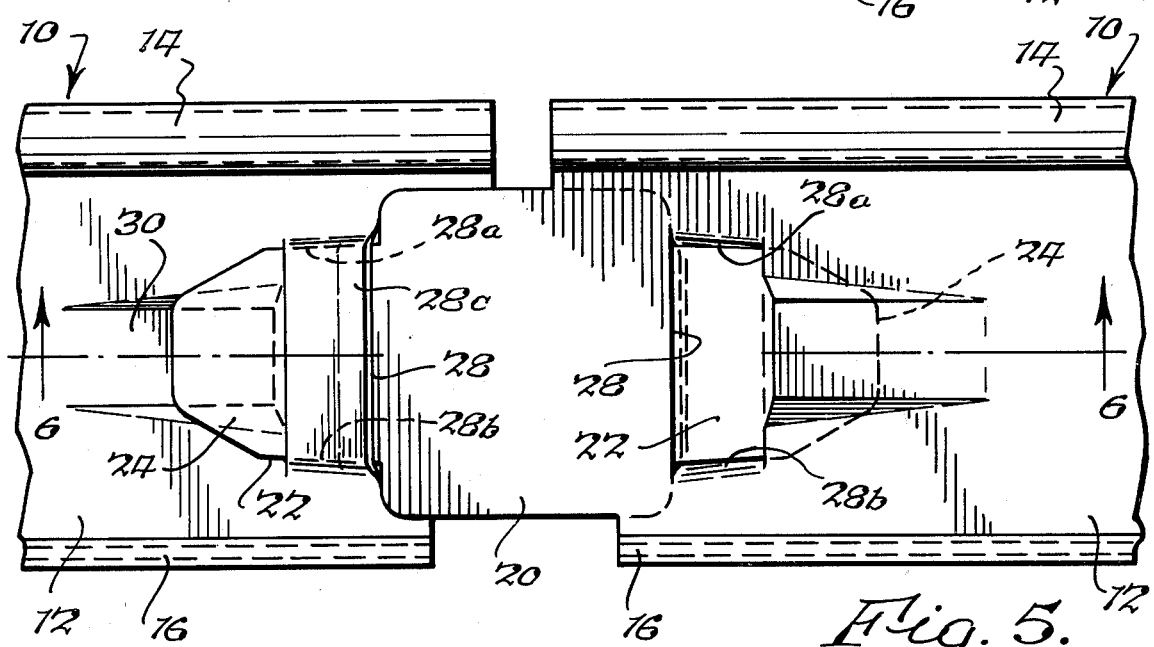
FIG. 5 is a fragmentary, enlarged view similar to FIG. 4 showing adjacent end portions of a pair of main beam members locked one to the other.
Figure 6:
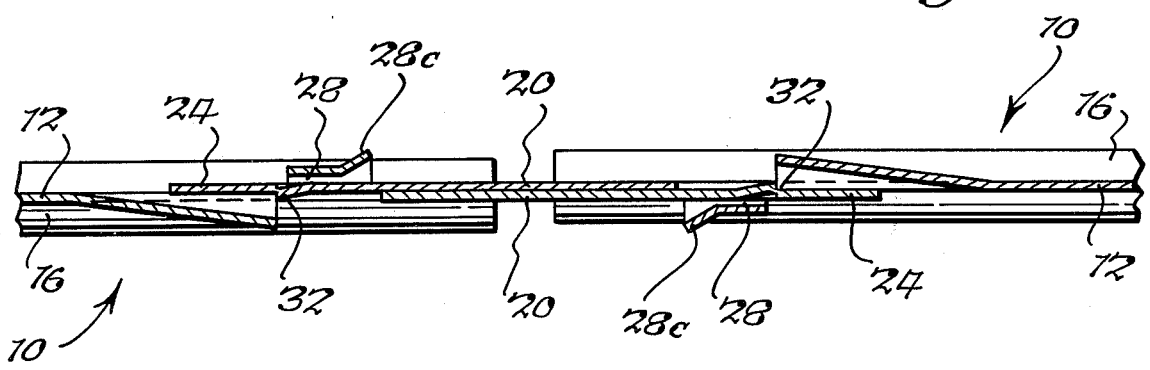
FIG. 6 is a longitudinal view, partly in section, of a pair of interlocked main beam members as taken about on line 6—6 of FIG. 5.

Turning now to a consideration of FIGS. 4 through 6, the end of the main beam member 10 shown in FIG. 4 includes a tongue 20 extending beyond the end of the web 12 with a tab 22 extending axially outwardly from the tongue 20. In addition, a tapered portion 24 is provided on tab 22 for purposes of interlocking the tongue 20 to another main beam member as to be described more fully hereinbelow. A slight impression or cut 32 is provided in the metal material approximately at the juncture of tab 22 and the locking portion 24 so as to facilitate bending of the latter with respect to the main body of tab 22. As clearly shown in FIG. 4, there is an opening provided in the web 12 of the main beam and generally designated 26 in FIG. 4. The opening 26 comprises the deformation of a portion web 12 laterally out of the plane thereof so as to essentially form a closed loop 28 extending laterally out of the plane of web 12 which is affixed to web 12 at its upper and lower edges 28a and 28b. As shown in FIG. 4, the deformed portion or loop 28 of the web 12 extends out of the rear side of the web.

Turning now to FIGS. 5 and 6, it is to be seen that the tongue 20 associated with the main beam on the right passes along the near side of web 12 of the main beam shown on the left. Necessarily, tongue 20 associated with the main beam on the left passes behind and adjacent to tongue 20 extending from the main beam on the right and passes through the punched out opening 28 in the main beam on the right, such opening or loop 28 extending rearwardly out of the plane of web 12 associated therewith. With tongues 20 being generally co-planar with webs 12, the axial center lines of the beams 10 are laterally displaced to a slight degree with respect to one another, such displacement in this embodiment approximating the lateral thickness of the tongue/web-material. Of course the beams 10 could be assembled in precise axial alignment by simply forming each tongue to be laterally off-set so as to complement one another.

As shown in FIG. 1, the locking portions 24 depending from tabs 22 are bent outwardly so as to prevent withdrawal of the tabs 22 from the adjacent web opening defined by the punched out loops 28. Accordingly, it has been found advantageous to provide a relief portion 30 in each web adjacent the opening therein and longitudinally aligned with the locking portions 24. As is to be appreciated from FIG. 6, the relief 30 enables the locking portion 24 to be easily bent outwardly from either side of the web. For example, a screw-driver could be inserted behind the locking portion 24 shown in FIG. 6 from either side of the web in order to bend the locking portion outwardly. Furthermore, the partial shearing of the material at 32 between tab 22 and the associated locking portion 24 facilitates the outward bending of the locking portion 24. Furthermore, in regard to FIGS. 4 through 6, it is to be noted that the leading edges 28c of the punched out portions 28 are flared outwardly. As to be described with respect to the folding of tongues 20 upon one another when the main beams are subjected to longitudinal compression, the relief provided by the outward flaring of edges 28c facilitates not only the initial engagement of the tabs 22 but also contributes to the predetermined movement of the adjacent tongue 20. In describing the deformation of the main beam splice hereinbelow, it is to be understood that one skilled in the art could employ a variety of splices similar to that described.

Turning now to FIGS. 7 through 10, the attachment of cross channel support members 18 to a main beam support member will be described. As shown, each cross channel support member 18 is of generally U-shaped construction when viewed in transverse cross section. Such construction includes a base portion 18a and leg portions 18b which are resiliently biased away from one another and which terminate in laterally extending edge portions 18c. Edge portions 18c have specially configured ends generally of a tapered or chamfered nature for reception in a corresponding pair of longitudinally spaced slots 34 provided in the web 12 of a main beam member. The ends of lateral edges 18c taper outwardly from the extreme end point thereof to form a shoulder 18d. Extending from shoulder 18d is another outwardly tapering portion 18e which forms the bottom edge of a notch when viewed in combination with shoulder 18d. FIGS. 7 and 8 illustrate the mounting and locking of the cross channel members 18 in the web 12 of a main beam 10. The extreme ends of the lateral edges 18c are inserted into a corresponding pair of slots 34. The slots 34 are generally shaped to receive the leading portions of the legs 18b and include outwardly extending recesses 34a for interaction with the leading tapered or chamfered portions of edges 18c, shoulders 18d and the bottom edge 18e of the notch associated with shoulder 18d. Accordingly, as the cross channels are urged through the web of the main beam, legs 18b are resiliently urged towards one another until shoulders 18d pass by the web openings whereupon the legs 18d snap apart to lock the shoulders 18i d behind web 12 so as to prevent withdrawal of the cross channel member therefrom. When the cross channels are not subjected to any type of movement as would be induced by thermal expansion, the biasing of legs 18b away from one another and the outward tapering of the notch bottom edge 18e on the lateral edges 18c urges or draws the shoulders 18d up against the side of web 12 as is clearly shown in FIG. 7. As to be described, the elongated bottom notch edges 18e provide for thermal expansion of the cross channels. However, if no thermal expansion relief were to be provided, the main body portion of edge 18c would only have to be spaced from shoulder 18d a distance approximating the thickness of web 12.

Necessarily, the cross channels 18 would be engaged with the main beam support members at appropriate spacings along the lengths thereof. For example, the main beams 10 could be provided with pairs of slots 34 at eight inch spacings on center with the actual spacings of the cross channel members being at sixteen or twenty-four inch centers. As is to be further viewed in FIG. 8, after the cross channels are engaged in slots 34, the height of the lateral edges 18c above the base portion 18a generally corresponds to the height of the apex of recess 34a above flange 16 so that base portion 18a of the cross channel is supported by flange 16.

It is considered an advantage of the present invention that the cross channel members can be readily assembled with main beam support members by the simple insertion of the cross channels into the slots 34. Such assembly procedure does not involve the necessity of further assembling clips or other types of fastening devices to connect the cross channels to the main beam. After the grid system is so assembled, dry wall panels may be placed against the undersurface of flanges 16 and base portions 18a of the cross channels. Metal screws may then be engaged for example in the base portions 18a to retain the dry wall panels in place.

Turning now to a consideration of the manner in which the grid system operates when subjected to extreme heat as associated with a fire for example, reference will be made to FIGS. 2, 3 and 9. FIG. 2 illustrates two main beam members 10 spliced together as generally shown in FIG. 1 with locking portions 24 bent outwardly. Necessarily, tabs 24 could be bent fully around to abut against the adjacent punched out loop portion 28 of the adjacent web. The tabs 22 each include an upper and a lower edge which are closely fit with respect to the upper and lower edge portions 28a and 28b respectively of the deformed portion 28 of the web so as to prevent any substantial vertical movement of the beam members relative to each other. Accordingly, as shown in FIG. 2, the main beams are spliced together in a generally rigid manner. Upon being subjected to heat, the main beams experience thermal expansion and having their end points fixed tend to compress toward one another. Upon the occurrence of such longitudinal compression, the tongues 20 will buckle or fold since the overlapping of the tongue edge portions 20a with respect to the upper and lower edges of the web loop portion 28 prevents further longitudinal movement of the beams toward one another absent such folding or buckling of the tongues 20. In this regard, the outward flaring of edges 28c on the web openings accommodates the folding of the tongues onto one another as shown in FIG. 3. The beam members longitudinally move toward one another while at the same time becoming laterally displaced with respect to one another. If the longitudinal compression of the beam members is extreme enough, the relative lateral displacement therebetween allows the bead portions 14 to overlap or pass by one another. During extreme buckling of the tongues 20 as shown in FIG. 3, the webs 12 of the beam members may tear to a certain extent below the respective beads at a point adjacent to tongues 20 so as to result in the displacement shown. As indicated hereinabove, other tongue and locking arrangements could be provided which could provide for the lateral displacement of the main beams during their respective expansions and which would embody the teaching of applicant's invention.

Similarly, the cross channels 18 may also experience thermal expansion and will tend to compress towards one another. In addition to such thermal expansion of the cross channel members, they also will be translated due to the corresponding displacement of the main beam members 10. Accordingly, the cross channels 18, as shown in FIG. 9, may resiliently move toward one another by movement of the notched bottom edges 18e through the slots 34 whereby the leg portions 18b will tend to cam toward one another. Necessarily the length of bottom edges 18e would correspond to the potential degree of thermal expansion experienced by the cross channels so that the main body of an edge portion 18c does not abut a web 12 in a compressive manner.

From the foregoing, it is apparent that the objects of the present invention have been fully accomplished in providing a grid support system for a dry wall ceiling which is readily assembled, can be easily disassembled if desired, and which is strong and rigid in use. Most importantly, the aforesaid grid support system for a dry wall ceiling is fire rated for maintaining the integrity of a dry wall ceiling structure upon the application of heat thereto, thereby preserving its fire retarding qualities. By the provision of the connecting splice means between the main beam members and the resilient, snap-locking nature of the connection for the cross channels to the main beam members, both longitudinal and transverse compression is absorbed in the grid system. Although the dry wall ceiling will possibly assume a drooping configuration upon extreme movements of the grid system components, the integrity of the ceiling as a fire barrier will be preserved.

Having thus described and illustrated a preferred embodiment of my invention, it will be understood that such description and illustration is by way of example only and that such modifications and changes as made suggest themselves to those skilled in the art are intended to fall within the scope of the present invention as limited only by the appended claims.

I claim:

1. A splice connection comprising: two generally aligned beam members each having a web means and a bead means surmounting said web means providing increased rigidity to said beam member, connecting means on adjacent ends of said web means splicing said beam members in an end-to-end relation, at least one of said connecting means comprising a tongue means extending beyond the end of said web means and said bead means, associated therewith and locking means interlocking said tongue means in an assembled relation to said beam members to prevent relative movement of said beam members with respect to one another, the adjacent ends of said bead means being normally spaced from one another and said tongue means being so configured to fold in a longitudinal manner, laterally out of the normal plane of said tongue means when said beam members are longitudinally compressed towards one another due to thermal expansion so that said bead means of said beam members become laterally displaced with respect to one another while moving towards one another in a longitudinal direction and the normal spacing between said beam means being of such extent that said bead means may longitudinally overlap one another when said beam members experience extreme relative longitudinal expansion.

2. A splice connection as set forth in claim 1 wherein at least one of said web means includes an opening therein with said tongue means being received therethrough.

3. A splice connection as set forth in claim 2 wherein said tongue means includes a tab portion which is received through said web opening, said tab portion includes an upper and lower edge and said web opening is partially defined by an upper and a lower edge whereby said upper and lower tab edges engage said upper and lower web opening edges in a tight friction fit to prevent any vertical movement of said beam members relative to each other.

4. A splice connection as set forth in claim 3 wherein said tongue means includes a shoulder abutting the edge of said web opening to prevent axial movement of said beam members towards one another.

5. A splice connection as set forth in claim 4 wherein said locking means comprises the end of said tab portion which is bent laterally outwardly from the plane of said web means through which it is received to prevent axial movement of said beam members away from one another.

6. A splice connection as set forth in claim 2 wherein a portion of the leading edge of said web opening is laterally offset from said respective web means thereby facilitating the folding of said tongue means in a predetermined manner.

7. A splice connection as set forth in claim 2 wherein said web opening comprises a pair of longitudinally spaced slots and said tongue means is received through both of said slots.

8. A splice connection as set forth in claim 1 wherein at least one of said beam members includes flange means extending laterally outwardly of said web means with said bead means extending axially beyond said flange means.

9. A splice connection as set forth in claim 8 wherein at least one of said web means includes an opening therein with said tongue means being received therethrough.

10. A splice connection as set forth in claim 9 wherein said tongue means includes a tab portion which is received through said web opening, said tab portion includes an upper and lower edge and said web opening is partially defined by an upper and lower edge whereby said upper and lower tab edges engage said upper and lower web opening edges in a tight friction fit to prevent any vertical movement of said beam members relative to each other.

11. A splice connection as set forth in claim 10 wherein said tongue means includes a shoulder abutting the edge of said web opening to prevent axial movement of said beam members towards one another.

12. A splice connection as set forth in claim 11 wherein said locking means comprises the end of said tab portion which is bent laterally outwardly from the plane of said web means through which it is received to prevent axial movement of said beam members away from one another.

13. A splice connection as set forth in claim 9 wherein a portion of the leading edge of said web opening is laterally offset from said respective web means thereby facilitating the folding of said tongue means in a predetermined manner.

14. A splice connection as set forth in claim 9 wherein said web opening comprises a pair of longitudinally spaced slots and said tongue means is received through both of said slots.

15. A supporting grid system comprising: a first support member having a web means associated therewith, said web having a pair of spaced slots therein, a second support member, said second support member having resiliently mounted, laterally extending edge portions, said edge portions being resiliently biased away from one another in opposite lateral directions and each respectively including a notch in the end portion thereof and said end portions of said edge portions being correspondingly received in said slots so that said notches correspondingly receive the non-adjacent edges of said slots wherein each of said notches includes an elongated bottom edge correspondingly engaging one of said non-adjacent slot edges, said bottom edges of said notches being of length greater than the width of said web means of said first support member and tapering towards one another so that said second support member tends to resiliently cam away from said first support member due to the engagement of said tapered bottom edges of said notches against said non-adjacent slot edges, and each said notch including shoulder means corrspondingly overlapping one of said non-adjacent slot edges to prevent a complete withdrawal of said laterally extending edge portions of said second support member from said slots whereby said second support member may displace toward said first support member resulting in said laterally extending edge portions and associated notches being urged towards one another.

16. A supporting grid system as set forth in claim 15 wherein the bottom surface of said second support member is knurled so as to facilitate the reception of metal screw means therethrough.

17. A supporting grid system as set forth in claim 16 further including a third support member similar in form to said second support member and being axially aligned therewith and received in said slots of said first support member from the side of said first support member opposite to the side thereof through which said second support member is received.

18. A supporting grid system comprising:
two generally aligned beam members each having a web means and a bead means surmounting said web means providing increased rigidity to said beam member, connecting means on adjacent ends of said web means splicing said beam members in an end-to-end relation, said connecting means comprising a tongue means extending beyond the end of at least one of said web means and said bead means, and locking means interlocking said tongue means in an assembled relation to said beam members to prevent relative movement of said beam members with respect to one another, the adjacent ends of said bead means being normally spaced from one another and said tongue means being so configured to fold in a longitudinal manner, laterally out of the normal plane of said tongue means when said beam members are longitudinally compressed towards one another so that said bead means of said beam members become laterally displaced with respect to one another while moving towards one another in a longitudinal direction whereby said bead means may longitudinally overlap one another when said beam members experience extreme relative longitudinal compression,
at least one of said beam member webs having a pair of longitudinally spaced slots, and
a support member having laterally extending edge portions, said edge portions being resiliently biased away from one another and each respectively including a notch in the end portion thereof with said end portions being correspondingly received in said slots so that said notches correspondingly engage the edges of said slots whereby said support member is retained in an assembled relationship with said beam members.

19. A supporting grid system as set forth in claim 18 wherein at least one of said beam members includes flange means extending laterally outwardly of said web means with said bead means extending axially beyond said flange means.

20. A supporting grid system as set forth in claim 18 wherein each of said notches includes an elongated bottom edge engaging said slot edge, said bottom edges of said notches tapering towards one another so that said support member tends to cam away from said beam members due to the engagement of said tapered bottom edges of said notches against said corresponding slot edges, and each said notch including shoulder means overlapping the respectively adjacent edge of said slot to prevent a complete withdrawal of said laterally extending edge portions of said support member from said slots whereby said support member may displace toward said beam members when said laterally extending edge portions and associated notches are urged towards one another.

21. A supporting grid system as set forth in claim 20 wherein at least one of said beam members includes a laterally extending flange and said support member is supported above said flange of said beam member.

22. A supporting grid system as set forth in claim 22 wherein said bead means of said beam member including said flange means extends axially beyond said flange means.

23. A supporting grid system as set forth in claim 20 wherein the bottom surface of said support member is knurled so as to facilitate the reception of metallic screw means therethrough.

24. A supporting grid system as set forth in claim 20 further including a second support member similar in form to the other said support member and being axially aligned therewith and received in said slots of said beam member from the side of said beam member opposite to the side thereof through which the other of said support members is received.

25. A supporting grid system as set forth in claim 20 wherein at least one of said web means of said beam members includes an opening therein with said tongue means being received therethrough.

26. A supporting grid system as set forth in claim 25 wherein said tongue means includes a tab portion which is received through said web opening, said tab portion includes an upper and lower edge and said web opening is partially defined by an upper and a lower edge whereby said upper and lower tab edges engage said upper and lower web opening edges in a tight friction fit to prevent any vertical movement of said beam members relative to each other.

27. A supporting grid system as set forth in claim 26 wherein said tongue means includes a shoulder abutting the edge of said web opening to prevent axial movement of said beam member towards one another.

28. A supporting grid system as set forth in claim 27 wherein said locking means comprises the end of said tab portion which is bent laterally outwardly from the plane of said web means through which it is received to prevent axial movement of said beam members away from one another.

29. A supporting grid system as set forth in claim 20 wherein a portion of the leading edge of said web opening is laterally offset from said respect web means thereby facilitating the folding of said tongue means in a predetermined manner.

30. A supporting grid system comprising: a first support member having a web means associated therewith, said web having a pair of spaced slots therein, a second support member, said second support member having laterally extending edge portions, said edge portions being resiliently biased away from one another and each respectively including a notch in the end portion thereof and said end portions being correspondingly received in said slots so that said notches correspondingly engage the edges of said slots so that said second support member is retained in an assembled relationship with said first support member wherein each of said notches includes an elongated bottom edge engaging said slot edge, said bottom edges of said notches tapering towards one another so that said second support member tends to cam away from said first support member due to the engagement of said tapered bottom edges of said notches against said slot edges, and each said notch including shoulder means overlapping the respectively adjacent edge of said slot to prevent a complete withdrawal of said laterally extending edge portions of said second support member from said slots whereby said second support member may displace toward said first support member when said laterally extending edge portions and associated notches are urged towards one another, and said first support member includes a laterally extending flange and said second support member is supported above said flange of said first support member.

31. A supporting grid system comprising: a first support member having a web means, said web means defining an opening configuration therein having a pair of spaced edges associated therewith, a second support member, said second support member having resiliently mounted, laterally extending edge portions, said edge portions being resiliently biased away from one another in opposite lateral directions and each respectively including a notch in the end portion thereof, and said end portions of said edge portions being correspondingly received in said opening configuration so that said notches correspondingly receive said spaced edges of said opening configuration wherein each of said notches includes an elongated bottom edge correspondingly engaging one of said spaced edges of said opening configuration, said bottom edges of said notches being of length greater than the width of said web means of said first support member and tapering towards one another so that said second support member tends to resiliently cam away from said first support member due to the engagement of said tapered bottom edges of said notches against said spaced edges of said opening configuration, and each said notch including shoulder means correspondingly overlapping one of said spaced edges of said opening configuration to prevent a complete withdrawal of said laterally extending edge portions of said second support member from said opening configuration whereby said second support member may displace toward said first support member resulting in said laterally extending edge portions and associated notches being urged towards one another.

32. A supporting grid system as set forth in claim 31 wherein said spaced edges of said opening configuration are disposed diametrically opposite to one another.

33. A supporting grid system as set forth in claim 31 wherein said opening configuration comprises a pair of slots spaced apart from one another.

34. A supporting grid system as set forth in claim 32 wherein said opening configuration comprises a pair of slots spaced apart from one another.

* * * * *